No. 642,667. Patented Feb. 6, 1900.
O. J. BEALE.
MECHANICAL MOVEMENT.
(Application filed Aug. 23, 1897.)
(No Model.) 2 Sheets—Sheet 1.
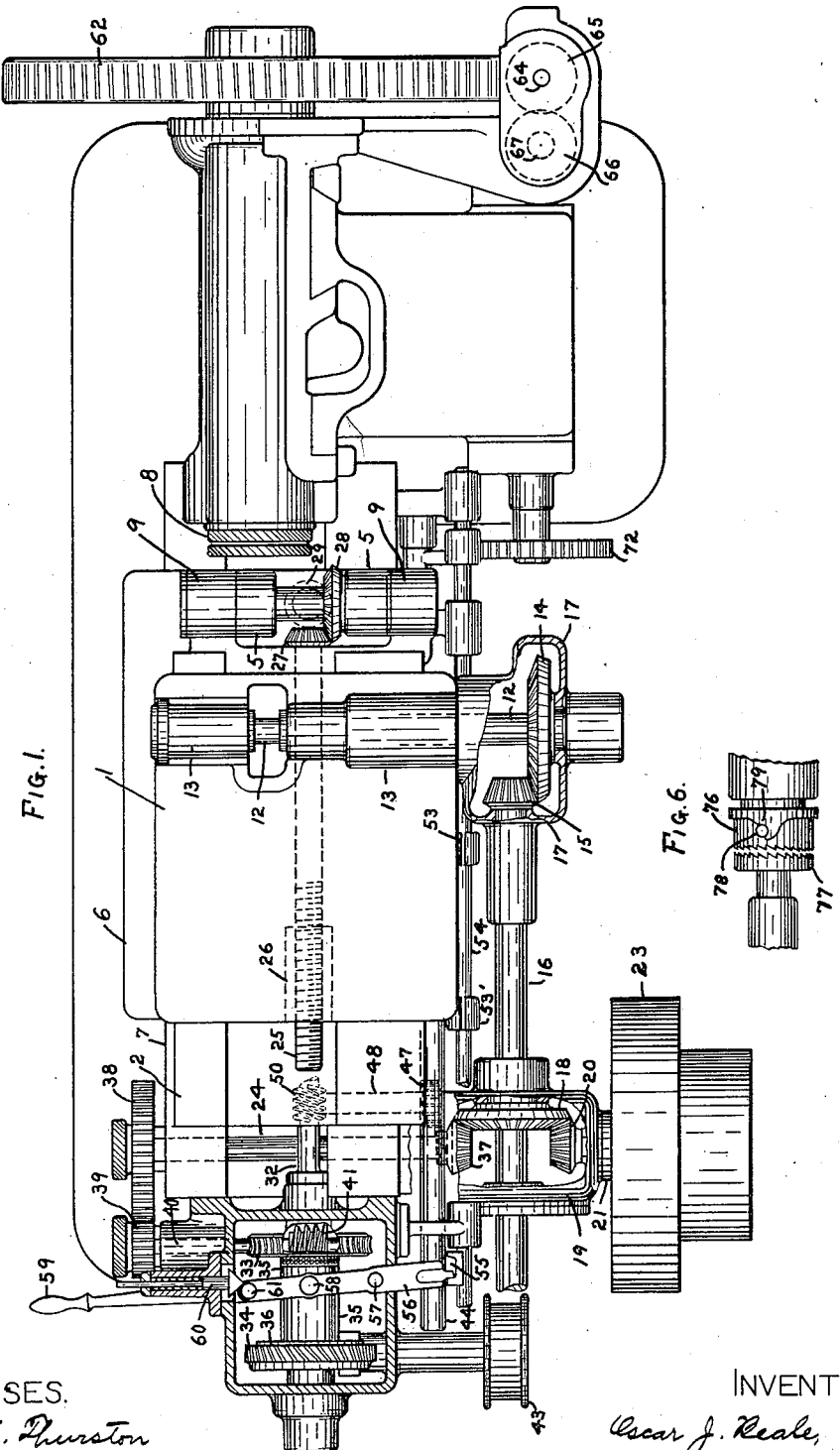
WITNESSES.
James H. Thurston
R. A. Bates.
INVENTOR.
Oscar J. Beale,
By Wilmarth H. Thurston,
Attorney.
THE NORRIS PETERS CO., PHOTO-LITHO., WASHINGTON, D. C.

No. 642,667. Patented Feb. 6, 1900.
O. J. BEALE.
MECHANICAL MOVEMENT.
(Application filed Aug. 23, 1897.)
(No Model.) 2 Sheets—Sheet 2.
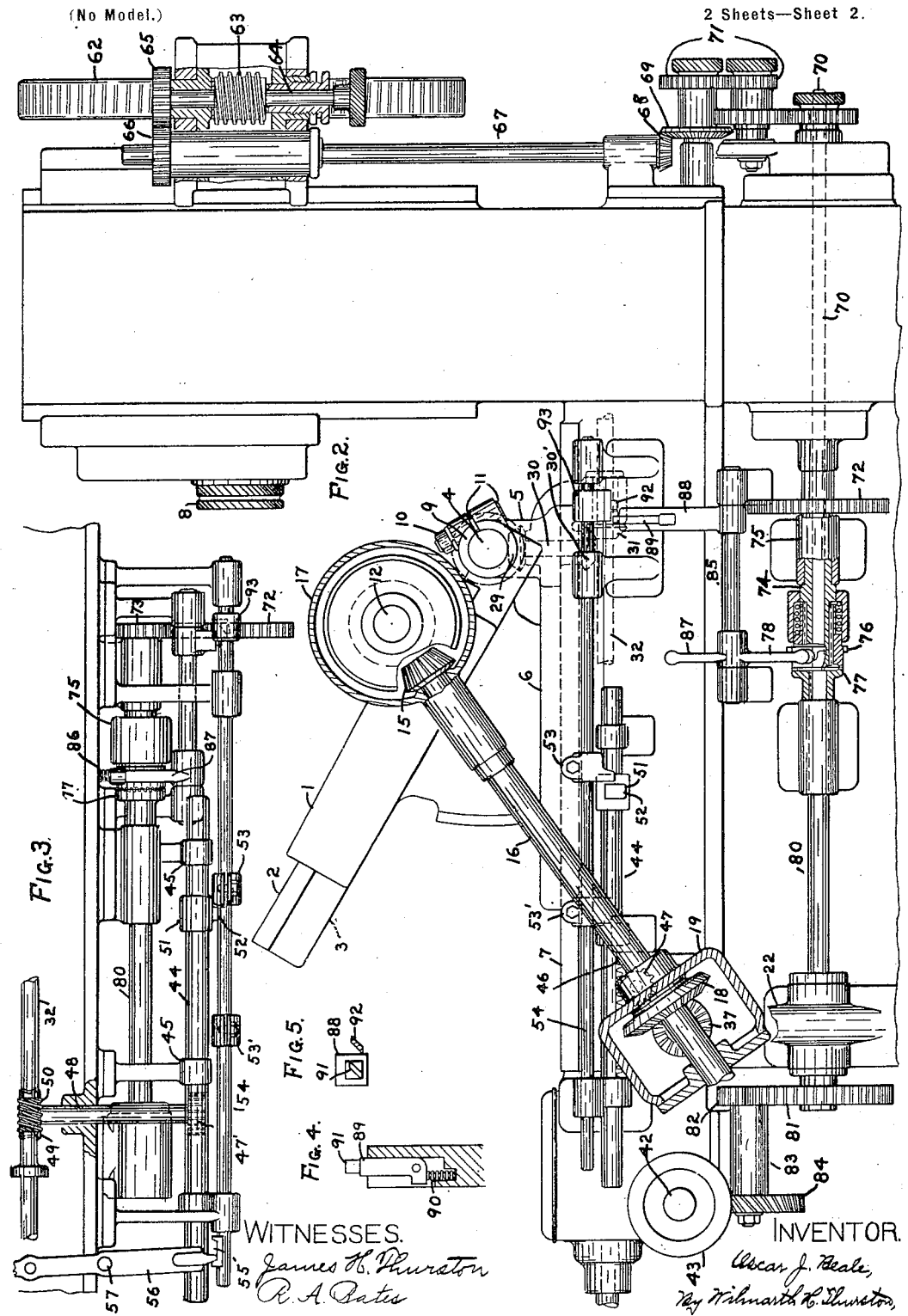

UNITED STATES PATENT OFFICE.

OSCAR J. BEALE, OF PROVIDENCE, RHODE ISLAND, ASSIGNOR TO THE BROWN & SHARPE MANUFACTURING COMPANY, OF SAME PLACE.

MECHANICAL MOVEMENT.

SPECIFICATION forming part of Letters Patent No. 642,667, dated February 6, 1900.

Application filed August 23, 1897. Serial No. 649,170. (No model.)

*To all whom it may concern:*

Be it known that I, OSCAR J. BEALE, of Providence, county of Providence, State of Rhode Island, have invented certain new and useful Improvements in Mechanical Movements; and I do hereby declare the following specification, taken in connection with the accompanying drawings, forming a part of the same, to be a full, clear, and exact description thereof.

The invention relates primarily to a mechanical movement which may be used in various relations where for any reason it is impracticable or inconvenient to control the reversal of the mechanism for reciprocating a part by the part itself, and comprises a primary reciprocating part, mechanism for reciprocating the same, including reversing mechanism, and a secondary part reciprocating in time with the primary part and controlling the operation of the reversing mechanism. This feature of invention may be used with advantage in cases where the primary part is a delicate part or carries delicate mechanism and cannot exert sufficient force to operate the reversing mechanism without injury to said part, in which case the secondary part may be driven with sufficient force to operate the reversing mechanism, and the movement of the delicate part may thus be accurately controlled without any strain upon the said part. The feature of invention may also be advantageously used in certain cases where it is desired to accurately reverse the primary part at a fixed point at each reciprocation, and in such cases the secondary part may be reciprocated at a higher rate of speed than the primary part and the accuracy of reversal correspondingly increased. Again, this feature of invention is useful in cases where it is desired to frequently vary the relative position of the primary part and the reversing mechanism and where for that reason it is inconvenient or impracticable to control said mechanism from the primary part.

One form of the mechanical movement forming the primary feature of invention is shown in the drawings embodied in a machine for cutting bevel-gears. The machine shown also illustrates certain other novel combinations forming further features of invention, which will be hereinafter described, and set forth in the claims.

In the accompanying drawings, Figure 1 is a plan view of a machine for cutting bevel-gears, illustrating one application of the present invention. Fig. 2 is a side elevation of said machine. Fig. 3 is a detail plan view of certain parts to be described, the position of said parts being distorted to more clearly illustrate the construction. Figs. 4, 5, and 6 are enlarged details of certain parts.

The cutter-carriage 1, which in this case forms the primary reciprocating part, is mounted on ways 2 on an adjustable tilting bed 3. The bed 3 is secured to a stud 4, carried by lugs 5, formed on a support or slide 6, adjustably secured on ways 7, formed on the frame of the machine. By moving the support 6 upon the ways 7 the bed 3 may be adjusted to or from the work-spindle 8, and by swinging said bed about the stud 4 the inclination of said bed may be adjusted. The support 6 may be rigidly clamped in its adjusted position upon ways 7 by any well-known means commonly used in this class of machines. The ears 9 on the bed 3, which engage the stud 4, may be split and said bed rigidly secured to said stud after being adjusted by nuts 10 on the ends of bolts 11. A shaft 12, on which the cutter may be secured, is mounted in bearings 13 on the carriage 1, and is driven by means of a bevel-gear 14, secured thereto, which is engaged by a bevel-gear 15, secured to a shaft 16. The end of shaft 16 is journaled in a frame 17, which is pivoted on the hub of gear 14 and on shaft 12, so that said frame may rock as the carriage 1 reciprocates or the bed 3 is adjusted. The shaft 16 passes through a bevel-gear 18, mounted in a frame 19, and is connected to said gear by a spline, so that said shaft will be driven by said gear while being free to move longitudinally to allow the adjustment of bed 3 and the reciprocation of carriage 1. The gear 18 is engaged and driven by a bevel-gear 20, secured to a short shaft mounted in a bearing 21, formed in a bracket 22, said shaft carrying at its outer end the cone-pulley 23. The frame 19 is pivoted on this shaft and on the shaft 24, to be described, so that said frame may rock as the bed 3 is adjusted or the carriage 1 reciprocated.

The carriage is moved on the ways 2 by means of a screw 25, which engages a nut 26, secured to said carriage. A bevel-gear 27 is secured to the end of screw 25 and is engaged by a bevel-gear 28, loosely mounted on stud 4. The gear 28 is engaged by a bevel-gear 29, secured to a shaft 30, mounted in the carriage 6, and having a second bevel-gear 30' secured to its other end, which gear is engaged by a bevel-gear 31, journaled in the carriage 6, and connected to the shaft 32 by a spline. The shaft 32 is suitably journaled in the frame and has loosely mounted thereon a worm-wheel 33 and a spiral gear 34. A clutch-sleeve 35 is splined to shaft 32, between the wheel 33 and the gear 34, and is provided with a clutch-face 35', adapted to engage worm-wheel 33, and with a friction clutch-face 36, adapted to engage gear 34. The worm-wheel 33 and the spiral gear 34 are constantly rotated in opposite directions, and the carriage 1 is moved in one direction or the other through shaft 32 and the connections described, according as one or the other of these drivers is connected to the shaft by the clutch 35.

The worm-wheel 33 is driven at a comparatively slow rate of speed to feed the carriage during the cutting operation from the pulley 23 by the following mechanism: The gear 18 engages a bevel-gear 37, secured to the shaft 24, which carries a gear 38 at its other end. The gear 38 engages a gear 39 on the end of a shaft 40, to which is secured a worm 41, which engages the worm-wheel 33. By changing the gears 38 and 39 the speed of the carriage during its active or cutting stroke may be varied. The spiral gear 34 is driven at a comparatively high rate of speed to quickly return the carriage after the cutting is completed by means of a spiral pinion (not shown) secured to a shaft 42, to which a band-pulley 43 is also secured. With this construction the mechanism for reversing the direction of movement of the carriage is mounted in the frame of the machine instead of upon the tilting bed 3, with the result that said mechanism is not in the way in setting up the machine for new work, is more accessible, and a simpler form of mechanism may be used. Any suitable means may be employed for automatically operating the reversing mechanism. By reason of the fact, however, that the inclination and position of the bed 3 must be varied for different forms of gears it is preferred to employ another feature of the invention in this connection—that is to say, it is preferred to control the reversal of the carriage by a part independent thereof and reciprocating in time therewith. In the form shown the part consists of a bar 44, mounted to slide in bearings 45, secured to the frame and provided with a rack 46 on its under side. The rack 46 is engaged by a pinion 47, secured to a short shaft 48, to the other end of which is secured a worm-wheel 49, engaged by a worm 50 on the shaft 32. The bar 44 and carriage 1 being driven from the same shaft will reciprocate in exact time with each other, although the bar moves at a slower speed than the carriage. The bar 44 is provided with a collar 51, having a lug or projection 52, which is arranged to engage adjustable dogs 53 53', secured to the shipper-bar 54. The shipper-bar 54 is provided with a recess 55, into which the end of the clutch-shifting lever 56 projects. The lever 56 is pivoted to the frame at 57 and is pivoted to a ring on the clutch 35 at 58 in a well-known manner. The lever extends beyond the clutch 35 and is provided with a handle 59 and a spring-pressed pin 60, provided with a V-shaped end which engages pin 61 on said lever and serves to hold the clutch 35 in engagement in either direction. Considering the machine to be in operation and the parts to be as shown in the drawings, the clutch 35 is in engagement with the spiral gear 34 and the shaft 32 is revolving in a direction to return the carriage 1 and to move the bar 44 toward the left, Figs. 3 and 4. When the lug 52 engages the dog 53', the bar 54 will be moved to the left and the clutch shifted into engagement with the worm-wheel 33, and the direction of rotation of shaft 32, and therefore the movement of carriage 1 and bar 44, will be reversed. The carriage 1 and bar 44 will now be moved in the opposite direction until the lug 52 strikes dog 53, when the clutch will be returned into engagement with the spiral gear 34 and the movement of the parts again reversed. Thus the carriage 1 and bar 44 will be reciprocated in time with each other, and the reversal of the mechanism for reciprocating the carriage 1 will be controlled by the bar 44, which is independent of said carriage. By controlling the reversal of the mechanism for reciprocating the carriage from a part independent of said carriage the reversing mechanism may be mounted in the stationary part of the frame and a simple and efficient construction provided for operating said reversing mechanism which does not interfere in any way with the adjustment of the bed 3 and which will control the movement of the carriage with the same accuracy with which said carriage would be controlled were the operation of the reversing mechanism controlled by the movement of the carriage itself.

The work-supporting spindle 8 is indexed at each complete reciprocation of the carriage 1 by suitable mechanism, and it is preferred to control the indexing mechanism from the same part which controls the reversal of the carriage, so that there shall be no danger that the indexing will get out of time with the carriage.

The indexing mechanism illustrated is as follows: The rear end of the work-supporting spindle 8 is provided with a worm-wheel 62, which is engaged by a worm 63, secured to a shaft 64. A gear 65 is secured to the shaft 64 and is engaged by a gear 66, connected to a shaft 67, which has a bevel-gear 68 secured to its lower end. The gear 68 is engaged by a bevel-gear 69, which is driven from a shaft 70 through a series of change-gears 71. The shaft 70 has a gear 72 secured to its front end, which is engaged by a gear 73, secured to a short shaft 74, mounted in the bearing 75. A spring-pressed clutch member 76 is keyed to the shaft 74 and is normally held out of engagement with a constantly-revolving clutch member 77 by an arm 78, which engages a cam 79 on the clutch member 76. The clutch member 77 is secured to the end of a shaft 80, which has a gear 81 secured thereto, which gear is engaged by a gear 82 on a short shaft 83. A spiral gear 84 is secured to the shaft 83 and is engaged and driven by a spiral gear on the constantly-running shaft 42. When the arm 78 is tripped, (by means to be described,) the clutch member 76 is forced by its spring into engagement with clutch member 77 and the shaft 74 is given a single revolution, when the cam 79 engages the arm 78 and throws the clutch member 76 out of engagement. Thus the work-spindle 8 is moved a step forward each time the arm 78 is tripped, the amount of movement depending on the relative sizes of the change-gears 71.

The arm 78 is secured to a rock-shaft 85 and is held in engagement with the clutch member 76 by a spring 86, which acts against an arm 87, also secured to the shaft 85. An arm 88 is also secured to the shaft 85 and carries a pivoted lever 89 at its upper end. The lever 89 is held in its normal position by means of a spring 90, so that said lever may yield in one direction. The lever 89 carries an inclined plate 91 at its upper end, which is arranged in the path of an inclined plate 92, secured to a collar 93, carried by the shipper-bar 54. When the bar 54 is moved to the right by the action of the bar 44, the plate 92 engages plate 91 and rocks the lever 89 against the tension of spring 90, the plate 92 thus passing plate 91 without tripping arm 78. When the bar 54 is moved to the left, however, to shift the clutch 35 into engagement with the worm-wheel 33, the plate 92 will again engage plate 91 and rock the arm 88, thus tripping arm 78 and throwing the indexing mechanism into operation. The recess in the bar 54 is arranged to allow a slight lost motion between said bar and the lever 56, so that the indexing mechanism is operated before the motion of the carriage is reversed.

What I claim as my invention, and desire to secure by Letters Patent, is—

1. The combination of a primary part, mechanism for reciprocating said part embodying reversing mechanism, and a secondary part reciprocating independently of and in time with said primary part for controlling said reversing mechanism.

2. The combination of a primary part, mechanism for reciprocating said part embodying reversing mechanism, and a secondary part independently driven from said reciprocating mechanism for controlling said reversing mechanism.

3. The combination of a primary part, mechanism for reciprocating said part embodying reversing mechanism, a secondary part reciprocating independently of and in time with said primary part for operating said reversing mechanism.

4. The combination of an adjustable bed, a primary part mounted to reciprocate on said bed, mechanism for reciprocating said part embodying reversing mechanism, and a secondary part mounted independent of said bed and reciprocating in time with said primary part for controlling said reversing mechanism.

5. The combination of a tilting bed, a primary part mounted to reciprocate on said bed, mechanism for reciprocating said part embodying reversing mechanism, a secondary part mounted independently of said bed and reciprocating in time with said primary part for controlling said reversing mechanism.

6. The combination of an adjustable bed, a carriage mounted to reciprocate upon said bed, mechanism for reciprocating said carriage embodying a reversing mechanism, a bar reciprocating independently of said carriage for operating said reversing mechanism.

7. The combination of an adjustable bed, a carriage mounted to reciprocate thereon, mechanism for reciprocating said carriage embodying a reversing mechanism, a bar mounted independently of said bed for controlling said reversing mechanism, means independent of the movement of said carriage for reciprocating said bar.

8. The combination of an adjustable bed, a carriage mounted to reciprocate thereon, mechanism for reciprocating said carriage embodying a reversing mechanism, and a bar mounted independently of said bed and driven from said reciprocating mechanism for controlling said reversing mechanism.

9. The combination of a shaft, mechanism for revolving said shaft in each direction, a primary reciprocating part driven from said shaft, a secondary reciprocating part driven from said shaft, and means for controlling the direction of rotation of said shaft from said secondary part.

10. The combination of an adjustable bed, a carriage mounted to reciprocate thereon, a shaft for operating said carriage mounted independently of said bed, and means mounted independently of said bed for controlling the direction of rotation of said shaft.

11. The combination of an adjustable bed, a carriage mounted on said bed, a shaft mounted independently of said bed, and connected to operate said carriage, two oppositely-moving drivers for said shaft, mechanism for connecting either of said drivers to the shaft, and a bar operated from said shaft for controlling said mechanism.

12. The combination of an adjustable bed, a carriage mounted on said bed, a shaft mounted independently of said bed and connected to operate said carriage, two oppositely-moving drivers for said shaft, mechanism for connecting either of said drivers to said shaft, and a bar mounted independently of said bed and operated from said shaft for controlling said mechanism.

13. The combination of an adjustable bed, a carriage mounted on said bed, a shaft mounted independently of said bed and connected to operate said carriage, two oppositely-moving drivers for said shaft, a clutch for connecting either of said drivers to said shaft a shipper for shifting said clutch from one driver to the other, a bar operated from said shaft for operating said shipper.

14. The combination of an adjustable bed, a carriage mounted on said bed, a shaft mounted independently of said bed and connected to operate said carriage, two oppositely-moving drivers for said shaft, a clutch for connecting either of said drivers to said shaft, a shipper for shifting said clutch from one driver to the other, and a bar mounted independently of said bed and operated from said shaft for operating said shipper.

15. The combination of an adjustable bed, a carriage mounted to reciprocate on said bed, mechanism for reversing the direction of movement of said carriage embodying a shipper provided with adjustable dogs, and a reciprocating bar for engaging said dogs.

16. The combination of an adjustable bed, a carriage mounted to reciprocate thereon, mechanism for reversing the direction of movement of said carriage embodying a shipper provided with adjustable dogs, and a reciprocating bar mounted independently of said bed for engaging said dogs.

17. The combination of an adjustable bed, a carriage mounted to reciprocate on said bed, mechanism for reversing the direction of movement of said carriage, embodying adjustable dogs, a reciprocating part independent of said carriage and reciprocating in time therewith for engaging said dogs.

18. The combination of an adjustable bed, a carriage mounted to reciprocate thereon, mechanism for reversing the direction of movement of said carriage embodying adjustable dogs, and a reciprocating part mounted independently of said bed and reciprocating in time with said carriage for engaging said dogs.

19. The combination of a shaft, bed arranged at an angle to said shaft, a carriage mounted on said bed, mechanism for driving said carriage from said shaft, mechanism for reversing the direction of rotation of said shaft, a reciprocating part independent of said carriage for controlling said reversing mechanism.

20. The combination of a tilting bed, a carriage mounted to reciprocate thereon, mechanism for reversing the direction of movement of said carriage mounted independently of said bed, and mechanism for automatically operating said reversing mechanism.

21. The combination of a tilting bed, a carriage mounted to reciprocate thereon, a mechanism for reversing the direction of movement of said carriage mounted independently of said bed, and mechanism mounted independently of said bed for automatically operating said reversing mechanism.

22. The combination of a tilting bed, a shaft mounted in bearings independently of said bed, a carriage mounted on said bed, and operated from said shaft, and mechanism for automatically reversing the rotation of said shaft independently of the movement of said carriage.

23. The combination of an adjustable slide, a bed adjustably pivoted to said slide, a carriage on said bed, a shaft mounted in the stationary frame of the machine and connected to operate said carriage, mechanism for reversing the direction of rotation of said shaft, and mechanism for automatically operating said reversing mechanism.

24. The combination of an adjustable slide, a bed adjustably pivoted to said slide, a carriage on said bed, a shaft mounted in the stationary frame of the machine and connected to operate said carriage, mechanism for reversing the direction of rotation of said shaft, and mechanism independent of the movement of the carriage for automatically operating said reversing mechanism.

25. The combination of a tilting bed, a carriage mounted on said bed, a shaft mounted in stationary bearings connected to operate said carriage, two oppositely-rotating drivers for operating said shaft, a clutch for connecting either of said drivers to the shaft, and mechanism for automatically shifting said clutch from one driver to the other.

26. The combination of a tilting bed, a carriage mounted to reciprocate thereon, a cutter-shaft mounted on said carriage, mechanism for rotating said shaft, mechanism for reversing the direction of movement of said carriage mounted in the stationary frame of the machine, and mechanism for automatically operating said reversing mechanism.

27. The combination of a tilting bed, a carriage mounted to reciprocate thereon, a cutter-shaft mounted on said carriage, mechanism for rotating said shaft, mechanism for reversing the direction of movement of said carriage mounted in the stationary frame of the machine, and mechanism independent of the movement of the carriage for automatically operating said reversing mechanism.

28. The combination of a work-support, mechanism for indexing the same, a tilting bed, a cutter-carriage mounted to reciprocate thereon, mechanism for reversing the movement of the carriage mounted in the stationary frame of the machine, mechanism for automatically operating said reversing mechanism, and mechanism for controlling the indexing.

29. The combination of a work-support, mechanism for indexing the same, a tilting bed, a cutter-carriage mounted to reciprocate thereon, mechanism for reversing the movement of the carriage mounted in the stationary frame of the machine, mechanism independent of said carriage for automatically operating said reversing mechanism and controlling the indexing.

30. The combination of a reciprocating carriage a shaft 32 connected to operate the same, mechanism for reversing the shaft 32 embodying a shipping-bar 54 provided with adjustable dogs, a bar 44 having a projection for engaging said dogs, and gearing between bar 44 and shaft 32.

31. The combination of a reciprocating carriage, a shaft 32 connected to operate the same, mechanism for reversing the shaft 32 embodying a shipping-bar 54 provided with adjustable dogs, a bar 44 having a projection for engaging said dogs, a rack on said bar 44, a pinion engaging said rack, a shaft 48 to which said pinion is secured, and gearing between shaft 48 and shaft 32.

32. The combination with a tilting bed 3, a carriage 1 mounted thereon, a shaft 32 mounted in the stationary frame of the machine and connected to operate said carriage, mechanism for reversing the shaft 32 embodying a shipper-bar 54 mounted on the frame, and a bar 44 driven from shaft 32 for operating bar 54.

33. The combination of a work-support, mechanism for indexing the same, a cutter-carriage, mechanism for reciprocating said carriage, and a part independent of said carriage and reciprocating in time therewith for controlling the indexing mechanism.

34. The combination of a work-support, mechanism for indexing the same, a cutter-carriage, mechanism for reciprocating said carriage including reversing mechanism, and a part independent of said carriage and reciprocating in time therewith for controlling said reversing and said indexing mechanisms.

35. The combination of a work-support, mechanism for indexing the same, a tilting bed, a cutter-carriage mounted to reciprocate thereon, mechanism for reversing the movement of the carriage, and a part independent of said carriage, and reciprocating in time therewith for controlling said reversing mechanism and said indexing mechanism.

OSCAR J. BEALE.

Witnesses:
W. H. THURSTON,
R. A. BATES.